Sept. 28, 1965     I. BALINKIN     3,208,161

DEMONSTRATION DEVICE

Filed May 31, 1963     2 Sheets-Sheet 1

INVENTOR.
ISAY BALINKIN,
BY
Yungblut, Melville, Strauser & Foster

ATTORNEYS.

United States Patent Office 3,208,161
Patented Sept. 28, 1965

3,208,161
DEMONSTRATION DEVICE
Isay Balinkin, 1337 North Bend Road,
Hamilton County, Ohio
Filed May 31, 1963, Ser. No. 284,535
5 Claims. (Cl. 35—19)

The invention relates to a demonstration device, and more particularly to a device suitable for a classroom demonstration of the principle behind the operation of an optical maser or laser, or other phenomena of stored energy and trigger release.

The laser (light amplification by stimulated emission of radiation) is a relatively new development in the field of science. Basically, a laser is a device for producing a powerful pulse of light. The light so produced is in the form of a "coherent" beam capable of traveling great distances with relatively little spread. The development of the laser is of great importance today since it is likely to have significant applications in such fields as communication, chemistry, biology, astronomy, navigation, medicine, weaponry and the like.

In one of its simplest forms, a laser comprises a small rod of synthetic ruby with the chromium atoms as activators which is subjected to radiation of particular wave lengths. Atoms of chromium in the ruby crystal are "excited" to a higher state of energy by the radiation. At a certain threshold energy input, the chromium atoms suddenly return to their normal energy state releasing the above mentioned light pulse. The excitation of the atoms of the ruby crystal by the radiation is commonly referred to as "optical pumping." It is an object of the present invention to provide a classroom demonstration device to represent dynamically the phenomenon of optical pumping and resultant energy release.

It is an object of the present invention to provide such a demonstration device which is easy to operate and which may be used for repeated demonstrations.

It is an object of the present invention to provide such a demonstration device which is compact, self-contained, and inexpensive to manufacture.

These and other objects of the invention, which will be set forth hereinafter or will be apparent to one skilled in the art upon reading these specifications, are accomplished by that construction and arrangement of parts of which exemplary embodiments will now be described. Reference is made to the accompanying drawings wherein.

Figure 1:
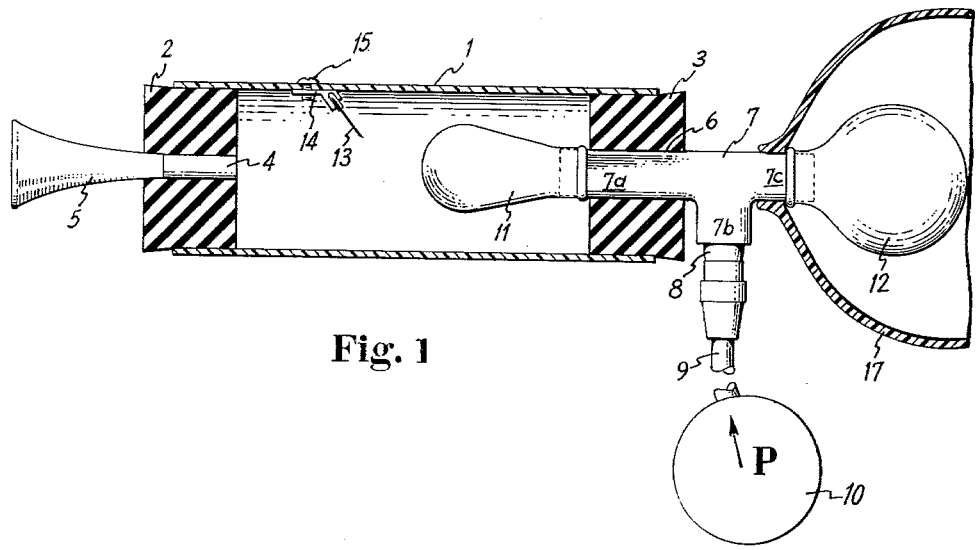
FIG. 1 is a longitudinal cross-sectional view of one embodiment of the present invention.

Referring to FIG. 1, the device comprises a body member 1 of cylindrical configuration and open at either end. The body 1 may be made of any suitable material such as metal, glass or plastic, and in the preferred embodiment is made of transparent plastic so that the inside thereof is readily visible. The open ends of the body 1 are provided with air-tight closures such as cork, rubber plugs, or detachable end pieces. In FIG. 1, rubber plugs are illustrated at 2 and 3. The plug 2 is provided with a central perforation 4 into which a small noise maker or horn 5 is inserted. The plug 3 is provided with a central opening 6 into which one arm 7a of a T-connection 7 is inserted. The T-connection may be made of any suitable material such as brass. A second arm 7b of the T-connection is provided with a fitting generally indicated at 8 for making an air-tight connection with a hose or conduit 9 leading to a pump 10. The pump 10 may be any commercial low pressure pump, including, for example, an electrically operated pump or an ordinary hand operated bicycle pump. It will be understood that the pump will be provided with an exit check valve which, if desired, may be located in the fitting 8. A portion of the T-connection arm 7a, which passes through the plug 3, extends part way into the hollow body 1 and has a small balloon 11 affixed thereto. The third arm 7c of the T-connection extends rearwardly of the arm 7a and a second balloon 12 is affixed thereto.

The balloon 11 may be of any suitable shape, but in the preferred embodiment it is of a generally cylindrical configuration. The balloon 12 may also be of any shape, but in the preferred embodiment it is of a generally spherical configuration. The balloons 11 and 12, which are of the ordinary commercial type, are so chosen that the balloon 12 expands more readily and more rapidly than the balloon 11 for a given amount of pressure from the pump 10.

A sharp object 13 is mounted within the hollow portion of the body 1, forwardly of the balloon 11 and near the end containing the plug 2. While the sharp object may be of any configuration such as a pin, blade or the like, it is illustrated in FIG. 1 as being a razor blade. The blade 13 may be mounted in any number of ways within the body 1 as, for example, in the plug 2. For purposes of an exemplary showing, the blade 13 is illustrated as being mounted to the side wall of the body 1 by means of a bracket 14 held thereto by a screw 15.

Briefly, the operation of this device is as follows. The body 1 of the device is mounted in any suitable manner within the ready view of those to whom the demonstration is addressed. The pump 10 is then actuated and the more readily expandable balloon 12 begins to inflate. When the balloon 12 is inflated to a point where the pressure required for further expansion is greater than the pressure required to distend the balloon 11, the balloon 11 begins to expand. Increased expansion of the balloon 11 causes the forwardmost end thereof to approach the blade 13. When the balloon 11 has been sufficiently extended to contact the blade 13, it is ruptured providing an opening for the escape of the air confined in the balloon 12. It will be understood by one skilled in the art that the air escaping from the balloon 12 will actuate the noise maker or horn 5. In this way the device of FIG. 1 demonstrates the application of an outside energy source to an object in which higher and higher energy levels are built up to a point where a limit is reached with a consequent sudden drop in the energy level resulting in the actuation of the horn 5 (corresponding to the sudden emission of a light pulse as in the case of a laser).

Figure 2:
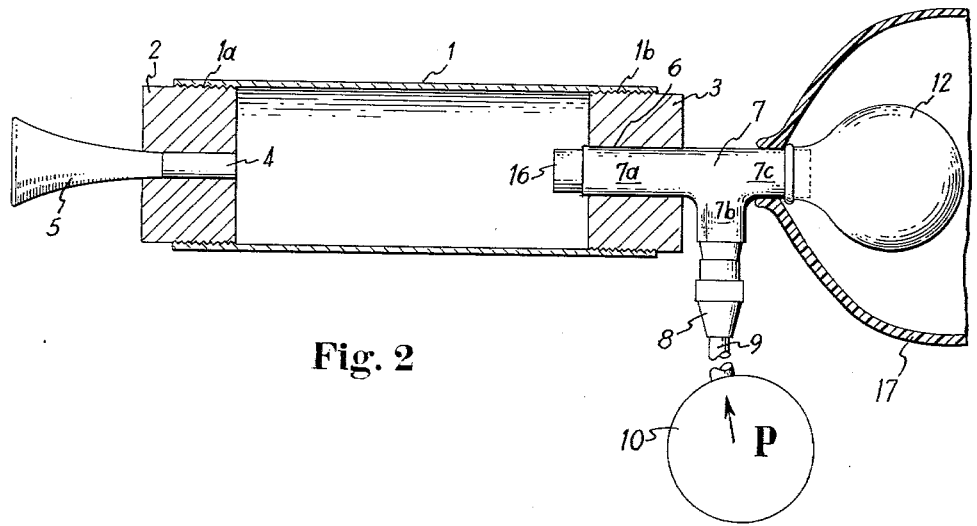
FIG. 2 is a longitudinal sectional view of another embodiment of the present invention.

FIG. 2 illustrates a second embodiment of the device, and like parts are given like index numerals. In the device of FIG. 2, the ends of the body 1 are provided with internal threading as indicated at 1a and 1b. The plugs 2 and 3, which may be made of any suitable material such as plastic, metal, or the like, are provided with external threads engageable by the ends of the body 1. In this structure the arm 7a of the T-connection 7 is provided with a cork, stopper or plug 16 rather than a balloon as at 11 in FIG. 1.

In the operation of the device of FIG. 2, the pump 10 is actuated, causing the balloon 12 to expand. The balloon 12 is expanded to a point where the pressure required for further expansion is greater than the pressure required to blow the cork 16 from the end of the arm 7a of the T-connection. When the cork 16 is blown free of the T-connection, the air in the balloon 12 is allowed to escape actuating the horn or noise maker 5. It will be noted that in this embodiment, the need for a rupturing device such as the blade 13 has been eliminated.

In both of the embodiments of FIGS. 1 and 2, it may be found desirable to make the device more positive in its action by providing an external confining means for the balloon 12. This confining means may be any suitable structure which will permit the balloon 12 to expand to a predetermined limit and no farther such, for example, as a cylindrical tube. For purposes of an exemplary showing, a confining means 17 is illustrated in FIGS. 1 and 2 as being an essentially spherical plastic ball affixed to the arm 7c of the T-connection 7. To enhance the effect of the demonstration device, the confining means 17 may be made of clear plastic. It will also be understood by one skilled in the art that the confining means may be of openwork construction, such as wire or plastic mesh or netting.

Figure 3:
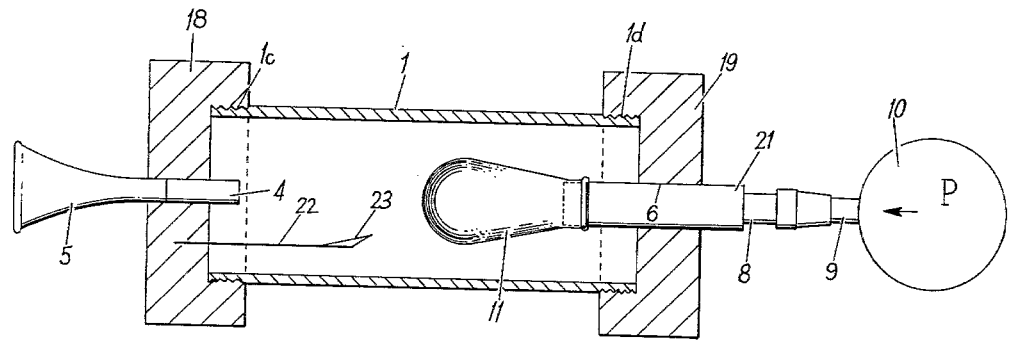
FIG. 3 is a longitudinal sectional view of yet another embodiment of the present invention.

FIG. 3 illustrates a third embodiment of the device, and like parts are given like index numerals. In the device of FIG. 3, the ends of the body 1 are provided with external threading as indicated at 1c and 1d. Detachable end pieces 18 and 19, which may be made of any suitable material, such as plastic, metal or the like, are provided with internal threads engageable with the ends of the body 1. In this structure, a horn or noise maker 5 is mounted in a perforation 4 in the closure member 18. This structure, however, does not make use of a T-connection. Instead, a tubular member 21 passes through the perforation 6 in the closure member 19. That end of the tubular member 21 which extends into the body 1 is provided with a balloon 11. The other end of the tubular member 21 is provided with a fitting 8 for making an air-tight connection with a hose or conduit 9 leading to a pump 10. While as stated above any sharp object may be used to pierce the balloon 11 for purposes of exemplary showing, the drawing illustrates an elongated rod-like member 22. One end of the member 22 is embedded in the closure member 18, while the other end is provided with a blade 23 which may be integral with the member 22 or prominently affixed to it.

It will be understood by one skilled in the art that the function of this embodiment is similar to the embodiments of FIGS. 1 and 2, but in this instance no reservoir 12 is provided. Here the pump 10 is actuated, and the balloon 11 inflates until the forwardmost end thereof contacts the blade 23. The blade 23 causes the balloon 11 to rupture and air escaping from it will actuate the horn or noise maker 5.

Modifications may be made in the invention without departing from the spirit of it. For example, in the device of FIGS. 1 and 3, the balloon 11 may be chosen with such characteristics that instead of rupturing upon contact with the blades 13 or 23, it has a capacity to expand sufficiently limited to cause it to rupture in and of itself. Further, in either of the embodiments of FIGS. 1 and 2, the plugs 2 and 3 may be in the form of rubber or cork stopper means, or threaded means engaging threads on the inner or outer wall of the body 1. It will also be understood by one skilled in the art that the plug 2 or end piece 18 in any of the embodiments may be made as an integral part of the body 1.

As will be pointed out hereinafter, for some demonstration purposes it may be desirable to have a time delay between the rupture of the balloon 11 or dislodgment of the plug 16 and the actuation of the horn or noise maker 5. This may be accomplished by providing a horn or noise maker 5 which has a maximum pressure beyond which it will not be actuated but will simply pass air. If this maximum pressure is less than the initial air pressure upon rupture of the balloon 11 or dislodgment of the plug 16, there will be a time delay until the air pressure within the body 11 is reduced to that maximum pressure. The duration of this time delay may be regulated by the addition of a bleeder valve in the line 9 (not shown), placed between the check valve (if used) and that portion of the T-connection 7 or tubular member 21 which leads to the balloon 11 or plug 16. It will be understood by one skilled in the art that if the bleeder valve is open, and air is allowed to leak out of the system, the maximum pressure of the horn or noise maker 5 will be reached more quickly.

Each part of this demonstration device and each step of its operation constitute elements of analogy between the demonstration device and a laser. The ruby crystal of a laser is represented by the plastic tube assembly of the demonstration device. The chromium atoms in the ruby crystal are represented by the rubber balloons 11 and 12 and horn or noise maker reeds. The laser's flash lamp or source of radiation may be equated to the pump 10, while the energy source for the laser may be related to the means powering the pump, which may be the demonstrator himself.

The various energy levels found in a laser are represented by this demonstration device as follows: ground energy level by atmospheric pressure, excited energy states by pressure above atmospheric, high energy state by balloon pressure, where balloons 11 and 2 are both used, the metastable state can be likened to pressure in the small balloon 11, radiation-less transition can be likened to air leakage in the demonstration device before balloon rupture or plug dislodgment, and stored energy of excited states in the atoms to stored energy of air in the rubber balloons. The number of atoms in a metastable state is represented by the size of the small ballon 11, while the threshold for "population inversion" is represented by the threshold for bursting of the ballon 11 or dislodgment of the plug 16. Air passage from the large balloon 12 to the small balloon 11 represents radiation-less transition to a metastable state. If the demonstration device is designed to have a delay in sound emission after balloon burst (as discussed above), this delay may be equated to the relaxation time after "population inversion" found in a laser. Finally, the life time of a pulse from a laser may be analogized to the duration of the sound emitted by the horn or noise maker 5.

The invention having been described in certain exemplary embodiments, what is claimed as new and desired to be secured by Letters Patent is:

1. A demonstration device of the type described comprising a hollow body, a noise making means affixed in air-tight fashion to one end of said body, a multiple armed conduit, a first arm of said conduit affixed in air-tight fashion to the other end of said body, means affixed to said first arm within said body to restrict the flow of air therethrough, said restricting means comprising a first balloon, an air pump means, a second arm of said conduit connected to said pump means, an air reservoir, a third arm of said conduit connected to said reservoir, said reservoir comprising a second ballon, said second balloon requiring initially less pressure to expand than said first balloon, and means within said hollow body for rupturing said first balloon.

2. The structure claimed in claim 1 wherein said rupturing means comprises a sharp instrument mounted within said body near said end to which said noise-making device is affixed to rupture said first balloon when said first balloon has sufficiently expanded to contact said instrument.

3. The structure claimed in claim 1 wherein confining means surround said second balloon to limit its expansion.

4. The structure claimed in claim 2 wherein said sharp instrument comprises a small blade affixed to the inside surface of said body.

5. The structure claimed in claim 2 wherein said noise making device is so constructed as to have a maximum pressure beyond which it will permit the passage of air without the emission of noise, said maximum pressure being less than the pressure required to expand said first balloon sufficiently to contact said sharp instrument.

References Cited by the Examiner

UNITED STATES PATENTS

| | | | |
|---|---|---|---|
| 436,651 | 9/90 | Dyer | 116—139 |
| 1,703,463 | 2/29 | Weigel | 46—87 |
| 2,565,363 | 8/51 | Garratt | 116—139 |
| 2,886,064 | 5/59 | Mercier | 46—87 X |
| 2,918,752 | 12/59 | Higgins | 46—87 X |

EUGENE R. CAPOZIO, *Primary Examiner.*

JEROME SCHNALL, *Examiner.*